United States Patent Office 3,684,578
Patented Aug. 15, 1972

3,684,578
FUEL CELL WITH ELECTRODES HAVING SPINEL CRYSTAL STRUCTURE
Shoji Makishima, 115, 1-chome, Kamitakaido, Suginami-ku; Hidefumi Hirai, 2122, 4-chome, Kamimeguro, Meguro-ku; Kazuo Tomiie, 4, 5-chome, Aoyama-Minamicho, Akasaka, Minato-ku; and Tetsuichi Kudo, 159 Tamagawa Oyamacho, Setagaya-ku, all of Tokyo, Japan
Continuation-in-part of application Ser. No. 566,819, July 21, 1966. This application Oct. 1, 1970, Ser. No. 77,339
Int. Cl. H01m 27/16
U.S. Cl. 136—86 F        2 Claims

ABSTRACT OF THE DISCLOSURE

A fuel cell is disclosed for use with high temperature. The cell is composed of electrodes having a spinel crystal structure made by sintering fine powders onto a solid electrolyte. The fine powders are composed of oxides of at least one metal of variable valency and of oxides of at least one metal selected from the group consisting of alkali metals, alkaline earth metals, rare earth metals, Zn, Cd, Ag, Al, Ga, In, Sn, Pb, As, Sb, Bi, and Ta. The novel cell is able to produce electricity efficiently by using practical fuels and various kinds of oxidizers.

---

This is a continuation-in-part application of our co-pending application Ser. No. 566,819, filed July 21, 1966 and now abandoned.

This invention relates to a fuel cell, and particularly to a new and improved type of fuel cell containing a solid electrolyte therein.

The fuel electrode of the fuel cells which have hitherto been in general use and which uses a solid electrolyte comprises metals alone such as Pt, Ni, Fe, etc. and has depended upon their surfaces for an adsorptional reaction. The electrode comprising such metals was used primarily for reaction with hydrogen with a relatively good result. But it should be noted that when a fuel such as a hydrocarbon is employed, the electrode of the type described is not only inferior in activity but decomposes the fuel. Accordingly, the electric current obtainable from the cell is reduced and the energy accruing from a practical fuel such as a hydrocarbon is converted into heat that is generated at the time of decomposition and decreases its energy efficiency. Carbon produced by decomposition of hydrocarbon fuel is deposited on the surface of the electrode and further decreases the activity of the electrode.

When a hydrocarbon is used as the fuel, polymerization of the hydrocarbon impairs its usefulness. And in the case of a catalytic electrode comprising metals such as Pt, Ni, and Fe the increase of surface area is intended to improve the activity of the electrode, but this has proved of no use in eliminating the disadvantages described above.

The known oxygen electrodes of fuel cells having a solid electrolyte comprises mainly Pt, and depends upon a surface adsorptional reaction in the same manner as the fuel electrode. Accordingly, the electric current density obtainable from the cell is limited. Therefore, increasing the surface area has been investigated, but no significant improvements in the performance of the oxygen electrode can be expected than in the case with the fuel electrode. Platinum has a great disadvantage in practical applicability not only because it tends to readily react with a very small amount of impure gas and hamper catalytic reactions but also because it is expensive. This invention affords an improvement over the prior types of fuel cell which eliminates or reduces the above discussed disadvantages.

The primary object of the invention is to provide a high performance fuel cell that will operate with various kinds of fuel including hydrocarbons and various kinds of oxidizers.

Another object of the invention is to provide a fuel cell having a long service life.

Another object of the invention is to provide a fuel cell operating at a high current density.

Still another object of the invention is to provide a fuel cell that can be produced at a low cost.

A description of an embodiment of the invention will be made in detail below with reference to the accompanying drawings in which.

Figure 3:
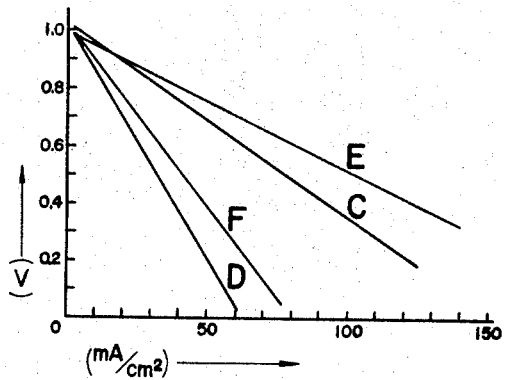
Figure 4:
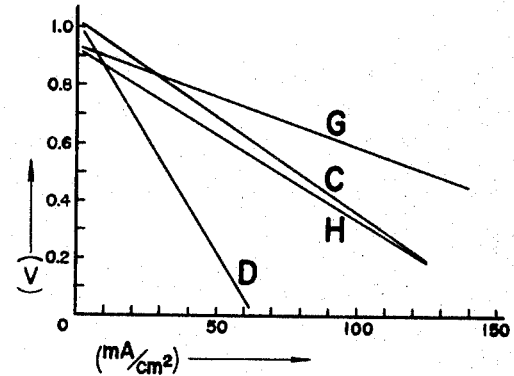

FIG. 3 is a diagram illustrative of a discharge curve in which voltage (V) is plotted against current density (ma./cm.$^2$) showing a comparison between the discharge characteristics of the inventive oxygen electrode and the prior art oxygen electrode in which Pt is used as the oxygen electrode; and FIG. 4 is a diagram illustrative of a discharge curve in which voltage (V) is plotted against current density (ma./cm.$^2$) showing a comparison between the discharge characteristic of the inventive fuel cell and the prior art type cell.

Figure 1:
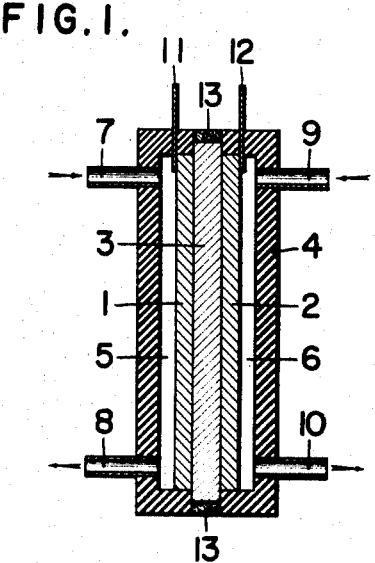
FIG. 1 is a longitudinal side elevation of a fuel cell according to the invention.

Referring now to the drawings, FIG. 1 represents a fuel cell embodiment according to the invention. Fuel electrode 1 and oxygen electrode 2 are disposed on opposite sides of solid electrolyte 3. The fuel cell element thus constructed is inserted into a cell case 4 formed of heat resisting insulating material such as silica to form a fuel gas space 5 and an oxygen gas space 6. The fuel is fed into the cell through the inlet port 7 and is discharged from the outlet port 8 as an exhaust gas after having been made to react with the fuel electrode. Negative terminal 11 and positive terminal 12 are preferably of platinum, are respectively in contact with fuel electrode 1 and oxygen electrode 2, and extend through the top of case 4. Sealant 13, such as fireproof cement, seals case 4.

The fuel cell of the invention is made up of fuel and oxygen electrodes and electrolyte in which at least one of the fuel and oxygen electrodes consists of fine powders treated at high temperatures. The fine powders are composed of mixed oxides of a plurality of metals of variable valency selected from the group consisting of Fe, Co, Ni, Mn, Cr, Cu, V and Ti and from the group consisting of alkali, alkaline earth (including Be), Zn, Cd, Ag, Ga, In, rare earths, Ge, Sn, Pb, As, Sb, Bi, Ta. The fuel may be a heavy oil, alcohol, hydrogen, or hydrazine, and a hydrocarbon such as methane, ethane, or propane which are fed to the fuel electrode side as a reducer, and air, oxygen or hydrogen peroxide is fed to the oxygen electrode as an oxidizer.

Referring to the fuel electrode, since catalytic electrodes in contact with the fuel produce a solid phase reaction and accelerate a catalytic reaction, the fuel electrode has an ideal fuel characteristic in that an oxidized reaction is coupled with an electrochemical reaction. Stated differently the characteristics of the fuel electrode comprising a plurality of metallic oxide catalysts makes it possible for the electrode oxidized by the electromotive reaction to contact the fuel and to be immediately reduced by a catalytic reaction. In other words, the electrode effects a reduction-oxidation or "redox" cycle through a solid phase reaction. The ability of the electrode itself to effect a redox cycle works without the fuel such as a hydrocarbon being decomposed into carbon, and consequently the fuel electrode is directly reduced. This increases the efficiency of the fuel and prevents carbon from being produced by decomposition of the fuel, as for example a hydrocarbon being deposited on the surface of the electrode. This shows that the electrode does not effect a surface adsorptional reaction with fuel but a redox cycle is carried out very quickly within the electrode by a solid phase reaction.

The most striking characteristics of the solid phase reaction of this redox cycle mechanism is that the catalytic electrode is caused to have a spinel crystal structure. The results of X-ray analysis shows that there is almost no difference in the spinel crystal structure of the electrode irrespective of whether the redox cycle is either in a state of reduction or in a state of oxidation, and that the fluctuation range of the redox cycle is very small and the redox cycle reaction is effected at high speed. Accordingly, the electrode is free from stress caused by the redox cycle reaction and it is superior in its mechanical strength.

Referring now to the oxygen electrode, it also can be composed of a plurality of metallic oxides and it has been demonstrated by X-ray analysis that the electrode is a redox cycle catalyst having a spinel crystal structure. A solid phase reaction with an oxidizer is effected in the electrode uniformly and quickly. That is, the electrode that is reduced by electromotive reaction is caused to be gradually oxidized by an oxidizer, thereby to effect a redox cycle. Without influencing the spinel crystal structure of the electrode, a very quick redox cycle is produced within relatively small fluctuation ranges between a higher oxidation state and a lower oxidation state.

The redox cycle mechanism of the fuel electrode and oxygen electrode described above may be explained by way of electro-chemical reaction formulas. The fuel electrode is expressed by:

$$MO_n + \text{fuel} \rightarrow MO_{n-x} + \text{oxidized product} \qquad (1)$$

$$MO_{n-x} + XO^{2-} \rightarrow MO_m + 2xe \qquad (2)$$

The oxygen electrode is expressed by:

$$M'O_m + x/2 O_2 \rightarrow M'O_{m-x} \qquad (3)$$

$$M'O_{m-x} + 2xe \rightarrow M'O_m + X'O^{2-} \qquad (4)$$

Hence, the following total formula:

$$\text{Fuel} + x/2 O_2 \rightarrow \text{oxidized product} \qquad (5)$$

In the above formulas, $MO_m$ and $M'O_m$ represent a metallic oxide of the fuel electrode and that of the oxygen electrode, respectively.

Co-pending United States application Ser. No. 857,625, filed by the present inventors on Aug. 29, 1969 as a continuation of United States application Ser. No. 492,434, now abandoned, relates to the structure and the composition of electrode catalysts of the fuel cell in which are used fused salts as an electrolyte and metallic oxide catalysts as an electrode. The fuel cell described in that application is a type of large capacity cell, while on the other hand the present invention relates to a fuel cell made up of a solid electrolyte and an electrode composed of metallic oxides. The cell of this invention is a portable and compact type of fuel cell, being easier to handle than the fuel cell described in that abandoned United States application.

The process of manufacturing the fuel electrode is as follows. Seven different metallic oxides of manganese dioxide, zinc oxide, chromium oxide, ferrous oxide, copper oxide, magnesium oxide, and aluminum oxide are mixed in a composition ratio of equivalent mols. That is to say, 6.37 gr. of manganese nitrate $(M_n(NO_3)_2 \cdot 4H_2O)$, 7.19 gr. of zinc sulfate $(Z_nSO_4 \cdot 7H_2O)$, 20.0 gr. of chromium nitrate $(Cr(NO_3)_3 \cdot 9H_2O)$, 19.6 gr. of ferrous ammonium sulfate $(FeSO_4(NH_4)_2 \cdot SO_4 \cdot 6H_2O)$, 6.24 gr. of copper sulfate $(CuSO_4 \cdot 5H_2O)$, 6.16 gr. of magnesium sulfate $(MgSO_4 \cdot 7H_2O)$, 23.7 gr. of aluminum potassium sulfate $(K_2Al_2(SO_4)_4 \cdot 24H_2O)$ are balanced, dissolved in 1 l. of water, and then neutralized with about 1 mol of dilute ammonium solution. The hydroxide thus obtained is rinsed in water, dried at 100° C. and then sintered at 1050° C. for about ten hours in the air. A test by X-ray analysis showed that the metallic oxide structure thus produced formed various solid solutions and had a spinel crystal structure.

Such a fuel electrode contains the following spinel complex oxides. That is to say, the fuel electrode consists of metallic oxides such as ZnO, $Cr_2O_3$ besides $ZnO \cdot Cr_2O_3$, $ZnO \cdot Al_2O_3$, $ZnO \cdot Fe_2O_3$, $MgO \cdot Fe_2O_3$, $MgO \cdot Cr_2O_3$ and $MnO_2$, CuO. It is difficult to quantitatively analyze the composition of the final product of the fuel electrode consisting of metallic oxides including these spinels, but qualitative X-ray analysis shows that the composition forms complicated spinels. The fuel such as a hydrocarbon prevents the spinels from becoming higher oxides through electrode reactions and quickly reduces them into lower oxides. This fuel electrode, at a temperature higher than about 500° C., drops to about $0.1$–$1\Omega^{-1} \cdot cm.^{-1}$ specific conductivity in the presence of a fuel and becomes a good conductor. It is necessary to make an initial selection of a metallic oxide composition so that an electrode material may have such characteristics.

A metallic oxide containing the above spinel is formed into $-200$ and $+325$ mesh powder. Twenty-five gr. of the metallic oxide thus meshed is mixed with 10 cc. of ethyl alcohol and then the mixture is applied on the surface of a solid electrolyte. The solid electrolyte disk of about 1 mm. in thickness and about 20 mm. in diameter is sintered to provide a 0.1–0.15 mm. layer on the surface of one side of the disk. A sintering temperature of about 1350° C. produces a good result.

Another method of forming a fuel electrode on the surface of a solid electrolyte of a larger area requires 25 gr. of metallic oxide, including the spinel, mixed with 100 cc. of ethyl alcohol. The metallic oxide is dispersed in the ethyl alcohol and sprayed onto the surface of the solid electrolyte by a spray gun. Spraying is controlled to form a layer of about $10\mu$ in thickness at a time. The spraying is repeated about 10 to 15 times, and then sintered at a temperature of 1350° C. The fuel electrode formed on the solid electrolyte has a porosity of about 45%, a thickness of about 0.1 to 1.5 mm., and a specific conductivity of $0.21\Omega^{-1} \cdot cm^{-1}$ in the presence of propane at 500° C. A silver net was pressed onto the fuel electrode to provide an electrical conductor.

The process of manufacturing the oxygen electrode is as follows. Five metallic oxides of manganese dioxide, nickel oxide, cobalt oxide, aluminum oxide, and magnesium oxide are mixed in a composition ratio of equivalent mols. Stated differently, 6.3 gr. of manganese nitrate $$(Mn(NO_3)_2 \cdot 4H_2O)$$

6.55 gr. of nickel sulfate $(NiSO_4 \cdot 6H_2O)$, 7.03 gr. of cobalt sulfate $(CoSO_4 \cdot 7H_2O)$, 6.16 gr. of magnesium sulfate $(MgSO_4 \cdot 7H_2O)$, 23.7 gr. of aluminum potassium sulfate $(K_2Al_2(SO_4)_4 \cdot 24H_2O)$ are balanced, dissolved in 1 l. of water, and then neutralized with about 1 mol of dilute ammonium solution. The hydroxide thus obtained is rinsed in water, dried at 100° C. and thereafter heated at 1050° C. for about 10 hours in the air. A test by X-ray analysis showed that the hydroxide structure thus prepared was a solid solution and had a spinel crystal structure as was the case with the fuel electrode.

Such an oxygen electrode containing the following spinel complex oxides, namely $NiO \cdot Al_2O_3$, $CoO \cdot Al_2O_3$, and metallic oxides NiO, CoO, $MnO_2$, MgO. It was difficult to quantitatively analyze the final composition of the oxygen electrode comprising the metallic oxides containing these spinel complex oxides, but it was possible to qualitatively analyze it. These spinel complex oxides and individual metallic oxides effect a reaction cycle of being reduced by an electrode reaction into lower oxides, quickly oxidized by an oxidizer into higher oxides. Since a specific conductivity of about $0.2$–$0.7\Omega^{-1} \cdot cm.^{-1}$ is obtained at about 500° C. in the presence of oxygen, electrical current is obtainable at low electrical resistance loss and with a high efficiency. It is necessary to select an initial composition of the electrode so that such conductivity may be obtained at such a high temperature in the presence of oxygen.

In the same manner as was previously described with reference to the fuel electrode, metallic oxides containing the above spinels effective for use as an oxygen electrode are formed as −200 and +325 mesh powder, and 25 gr. of the metallic oxides are mixed with 10 cc. of ethyl alcohol and the mixture applied on the other surface of the solid electrolyte and sintered at 1350° C. This treatment furnishes a strong layer on the surface of the solid electrolyte. Measurement shows that the oxygen electrode thus obtained has 50% porosity and is about 0.08–0.12 mm. thick. A specific conductivity of $0.35\Omega^{-1} \cdot cm.^{-1}$ was obtained at 500° from the oxygen electrode in the presence of oxygen. Electricity is conducted by a silver net in contact with, or embedded in, the oxygen electrode. This method makes the contact resistance sufficiently small so as to be negligible. The fuel and oxygen electrodes produced by the method described are quite suitable for carrying out the invention in that they are inexpensive to produce and provide improved performance.

The solid electrolyte is produced by the well-known method by which zirconium oxide ($ZrO_2$) and calcium oxide ($CaO_2$) are mixed in a mol ratio of 0.85 to 0.15; the mixture thus made is pulverized, stirred, passed through a 325 mesh screen, then pressed into shape under applied pressure of about 1 t./cm.$^2$ and finally sintered at 1500° C. for about 10 hours.

By the use of the electrodes thus obtained a cell as shown in FIG. 1 was produced and the following tests were conducted on the discharge characteristics thereof.

The characteristics of the fuel electrode of the fuel cell of the invention were tested as follows:

EXAMPLE 1

Figure 2:
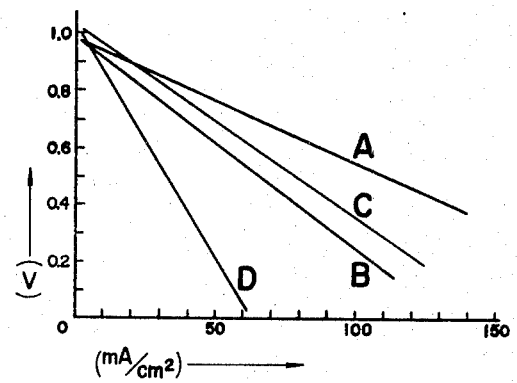
FIG. 2 is a diagram illustrative of a discharge curve in which voltage (V) is plotted against current density (ma./cm.$^2$) showing a comparison between the discharge characteristic of the inventive fuel electrode and the prior art fuel electrode in which Pt is used as the fuel electrode.

Fine powders for use in the solid electrolyte fuel cell described above were formed about 1 mm. in thickness, over one surface of which was applied a paste prepared by kneading the fine powders of metallic oxides with ethyl alcohol for use in the fuel electrode and over the other surface of which was applied a paste prepared by kneading the fine powders of platinum black with ethyl alcohol for use in the oxygen electrode, and was sintered at 1350° C. for about 2 hours. The electrodes were about 1 mm. in thickness respectively. To each electrode was soldered a platinum wire for use as a lead wire for measuring electric current and voltage. The reaction area of each of the electrodes was 3.2 cm.$^2$ and the over-all structure of the cell was made as shown in FIG. 1. Propane, for fuel, and oxygen were fed at a low flow rate of 100 ml./min. Each of the fuel cells in Examples 2 and 3 was made up of a cell produced under the same conditions and was tested under the same conditions. FIGS. 2 through 4 show discharge voltage (V) on the ordinate and current density (ma./cm.$^2$) on the abscissa, respectively. The characteristic curve of the fuel cell of the invention discharged at a working temperature of 1000° C. is shown by A in FIG. 2 and the characteristic curve of discharge shown at a working temperature of 910° C. is indicated by B. The fuel cell of a conventional type produced in the same manner as that of the invention by a combination of the solid electrolyte with the fuel electrode and the oxygen electrode, both of which used the well-known fine powders of platinum black, was discharged at cell temperatures of 1010° C. and 916° C. The results obtained from the discharge are shown by curves C and D. As is apparent from FIG. 2, the fuel electrode of the invention is far superior in discharge characteristic to the conventional cell electrode.

The characteristics of the oxygen electrode of the invention were tested as follows:

EXAMPLE 2

The fuel cell of the invention produced in the same manner as that in Example 1 by using metallic oxides in forming an oxygen electrode and the fine powders of platinum black in forming a solid electrode was discharged at a cell temperature of 1020° C. The discharge characteristic curve indicated by the discharge is shown by E and that shown at a cell temperature of 890° C. is shown by F in FIG. 3. The cell of a conventional type used in Example 2 is the same as that used in Example 1.

EXAMPLE 3

A test was conducted on the most preferred type of the fuel cell of the invention in which the catalytic electrode of metallic oxides was used both for a fuel electrode and for an oxygen electrode. This fuel cell was discharged and discharge characteristic curves at cell temperatures of 1010° C. and 980° C. are represented by G and H in FIG. 4, respectively. The cell of conventional type used in Example 3 is the same as in Example 1 and the discharge characteristics are shown likewise by C and D.

It is apparent from FIG. 4 that the fuel cell of the invention is far superior to that of a conventional type, and particularly from FIGS. 2 and 3 that the fuel cell of the invention has excellent fuel electrode characteristics.

The solid electrolyte described above used $ZrO_2$ stabilized by CaO. In this case a reaction was effected by conduction of the oxygen ions. Additionally, zirconium oxide may be replaced by hafnium oxide ($HfO_2$), uranium oxide ($UO_2$) or thorium oxide ($ThO_2$). Furthermore, calcium oxide may be replaced by magnesium oxide (MgO), yttrium oxide ($Y_2O_3$), etc. Since the solid electrolyte must be maintained at a temperature of about 1000° C. to obtain sufficient conductivity, it is to be understood that fixed electrolyte having a matrix of magnesium oxide (MgO) that works at about 500° C. impregnated with alkali carbonate may be used without departing from the scope and spirit of the invention. In this case a reaction is effected by the conduction of carbonate ions which is not at all different from the conduction of oxygen ions in the case of the solid electrolyte described above. The electrolyte is mixed at an equal mol ratio of $CO_2$ to an oxidizer.

When a solid electrolyte is combined with an electrode comprised of metallic oxides, it has been found that sintering makes adhesiveness between the electrode and the solid electrolyte stronger than it would be by mere deposition, and improves not only mechanical strength but the conductivity.

As described, the invention is very suitable for practical use in that it makes it possible not only to dispense with high cost metals and to use relatively low cost metallic oxides but to provide a fuel cell easily operated and compact in size. While the invention has been described and illustrated with reference to specific embodiments thereof, it is to be understood that many changes and modifications may be made therein without departing from the scope and spirit of the invention.

What we claim is:

1. A fuel cell comprising a solid electrolyte, an oxygen and a fuel electrode each electrode having a spinel crystal structure; said oxygen electrode consists essentially of nickel oxide, cobalt oxide, manganese oxide, aluminum oxide and manganese dioxide; and said fuel electrode consists essentially of chromium oxide, ferrous oxide, copper oxide, manganese dioxide, magnesium oxide, aluminum oxide, and zinc oxide; whereby an electromotive reaction is produced within each of said electrodes by a solid phase reaction with the fuel and oxygen electrodes respectively directly reduced and oxidized in the presence of respective reduction and oxidizing agents.

2. A fuel cell as in claim 1 wherein said solid electrolyte consists essentially of compounds selected from a first group consisting of zirconium oxide, hafnium oxide, uranium oxide and thorium oxide and a second group consisting of calcium oxide, magnesium oxide and yttrium oxide wherein the mol content between said first group and said second group is 0.85 and 0.15.

References Cited

UNITED STATES PATENTS 3,436,269  4/1969  Mitoff _____ 136—86 F

FOREIGN PATENTS 789,089  7/1968  Canada _____ 136—86 F

WINSTON A. DOUGLAS, Primary Examiner

M. J. ANDREWS, Assistant Examiner